US009209992B2

(12) United States Patent
Nelke et al.

(10) Patent No.: US 9,209,992 B2
(45) Date of Patent: Dec. 8, 2015

(54) METHOD, DATA PROCESSING PROGRAM, AND COMPUTER PROGRAM PRODUCT FOR HANDLING INSTANT MESSAGING SESSIONS AND CORRESPONDING INSTANT MESSAGING ENVIRONMENT

(75) Inventors: Sebastian Nelke, Boeblingen (DE);
Martin Oberhofer, Boeblingen (DE);
Yannick Saillet, Boeblingen (DE); Jens Seifert, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/917,877

(22) Filed: Nov. 2, 2010

(65) Prior Publication Data
US 2011/0161445 A1 Jun. 30, 2011

(30) Foreign Application Priority Data
Dec. 28, 2009 (EP) .................................... 09180788

(51) Int. Cl.
*G06F 15/16* (2006.01)
*H04L 12/58* (2006.01)

(52) U.S. Cl.
CPC .............. *H04L 12/581* (2013.01); *H04L 51/04* (2013.01)

(58) Field of Classification Search
USPC .................................. 709/206, 201, 204, 227
See application file for complete search history.

(56) References Cited

U.S. PATENT DOCUMENTS

| | | | |
|---|---|---|---|
| 2006/0271569 A1* | 11/2006 | Fong et al. .................... | 707/100 |
| 2009/0044132 A1* | 2/2009 | Combel et al. ................ | 715/753 |
| 2010/0312547 A1* | 12/2010 | Van Os et al. ..................... | 704/9 |
| 2011/0167433 A1* | 7/2011 | Appelbaum et al. .......... | 719/318 |
| 2011/0168433 A1* | 7/2011 | Kusaka ......................... | 174/255 |
| 2011/0264663 A1* | 10/2011 | Verkasalo ..................... | 707/740 |
| 2012/0009900 A1* | 1/2012 | Chawla ......................... | 455/411 |
| 2012/0089924 A1* | 4/2012 | Weaver et al. ................. | 715/752 |

OTHER PUBLICATIONS

Mack, R., et al. "Knowledge Portals and the Emerging Digital Knowledge Workplace," IBM Systems Journal, vol. 40, No. 4, pp. 925-955. 2001.

* cited by examiner

*Primary Examiner* — Lan-Dai T Truong
(74) *Attorney, Agent, or Firm* — Holland & Knight LLP; Brian J. Colandreo, Esq.; Jeffrey T. Placker, Esq.

(57) ABSTRACT

An improved method for handling instant messaging sessions in an instant messaging server is disclosed. The method comprises providing global annotators for annotating instant messaging communications, wherein instant messaging users are being able to select for a private enhancement stack at least one of the following: annotators and look-up services; providing instant messaging users with a capability to obtain contextual information by activating enhancement functions provided by said private enhancement stack; establishing an instant messaging session between a set of instant messaging users; and supporting sharing said contextual information among said set of instant messaging users as part of the instant messaging session.

19 Claims, 5 Drawing Sheets

METHOD, DATA PROCESSING PROGRAM, AND COMPUTER PROGRAM PRODUCT FOR HANDLING INSTANT MESSAGING SESSIONS AND CORRESPONDING INSTANT MESSAGING ENVIRONMENT

CROSS REFERENCE TO RELATED APPLICATION(S)

This application claims priority under 35 U.S.C. §119 or 365 to European, Application No. 09180788.3, filed Dec. 28, 2009.

The entire teachings of the above application(s) are incorporated herein by reference.

FIELD OF INVENTION

The present invention relates in general to the field of instant messaging conversations among a multiple of instant messaging users, and in particular to a method for handling instant messaging sessions, and a corresponding instant messaging environment. Still more particularly, the present invention relates to a data processing program and a computer program product for handling instant messaging sessions.

BACKGROUND

In today's working environments, information is one of the core assets for enterprises of all businesses. Especially for employees working in a globally integrated company, instant messaging is due to its real-time capability one of the most important tools to communicate and exchange information.

In the Patent Application Publication US 2008/0201434 A1 "CONTEXT-SENSITIVE SEARCHES AND FUNCTIONALITY FOR INSTANT MESSAGING APPLICATIONS" by Holmes et al. instant messaging applications are disclosed. The disclosed instant messaging applications comprise that in the context of an instant messaging application, a conversation is analyzed and contextually or textually relevant keywords and/or phrases are identified. These keywords or phrases are then highlighted in a visually-identifiable manner for selection by an individual participating in the conversation. Once selected by an individual, a user interface is presented and exposes the individual or individuals in the conversation to various contextually- or textually-relevant material or functionality that pertains to the selected word or phrase. An individual can also manually select a word or phrase to access the user interface that exposes contextually or textually-relevant material or functionality. At least some of this relevant material or functionality is presented to the user in the context of the instant messaging application and in a manner in which it can be consumed by the individual within the instant messaging application itself.

Today's instant messaging systems are easy and comfortable to use but are usually not integrated in the user's context of work. This causes several problems since information from various back-end systems is not available on the fly but must be gathered manually which is cumbersome, time consuming and error prone. The instant messaging client is only a starting point of work. Work items and tasks that are determined during instant messaging communication have to be handled in separate infrastructure although the instant messaging client could be a perfect hub of information and action as it is in the context of the current discussion and "knows" everything about the discussion history, the discussion topic and the people involved. Information about the users' scope of work, organizational structures, the geographic location and time zones the different users reside in are not regarded, this could lead to misunderstandings, inefficient communication and discussions at cross-purposes.

BRIEF SUMMARY

The technical problem underlying the present invention is to provide a method for handling instant messaging sessions and an instant messaging environment, which are able to solve the above mentioned shortcomings and pain points of prior art instant messaging conversations, and to provide a data processing program and a computer program product to perform the method for handling instant messaging sessions.

According to the present invention this problem is solved by providing a method for handling instant messaging sessions having the features of claim 1, an instant messaging environment having the features of claim 11, a data processing program for performing the method for handling instant messaging sessions having the features of claim 14, and a computer program product causing a computer to perform the method for handling instant messaging sessions having the features of claim 15. Advantageous embodiments of the present invention are mentioned in the sub claims.

Accordingly, in an embodiment of the present invention a method for handling instant messaging sessions in an instant messaging server, comprises providing global annotators for annotating instant messaging communications, wherein instant messaging users are being able to select for a private enhancement stack at least one of the following: annotators and look-up services; providing instant messaging users with a capability to obtain contextual information by activating enhancement functions provided by the private enhancement stack; establishing an instant messaging session between a set of instant messaging users; and supporting sharing the contextual information among the set of instant messaging users as part of the instant messaging session.

In further embodiments of the present invention, during startup of the instant messaging session a stack of common annotators and/or look-up services is determined comprising all annotators and/or look-up services, which the corresponding private enhancement stacks of the instant messaging users have in common.

In further embodiments of the present invention, potential useful private and/or common annotators and/or look-up services for the instant messaging session of the set of the instant messaging users is determined by using a static determination process.

In further embodiments of the present invention, during the static determination process at least one data mining algorithm is used on profile information of the instant messaging users and/or on usage statistics of previous instant messaging sessions between at least two instant messaging users of the set of instant messaging users of the actual instant messaging session.

In further embodiments of the present invention, during the instant messaging session each sent message is analyzed, wherein new potential useful common and/or private annotators and/or look-up services for the instant messaging session are determined by using a dynamic determination process.

In further embodiments of the present invention, during the dynamic determination process a regular expression filter and/or a dictionary based analyzer and/or a semantic analyzer are used on text of the send message.

In further embodiments of the present invention, look-up services are used to enrich an entity detected by an annotator with additional information and/or to start actions on selected entities.

In further embodiments of the present invention, common annotators and/or look-up services and/or private annotators of the corresponding instant messaging users of the actual instant messaging session are displayed in different colors and/or other visually distinguishable different features.

In further embodiments of the present invention, an authentication and/or security check based on the profile information of the instant messaging users is performed before the contextual information among the set of instant messaging users as part of the instant messaging session is shared.

In further embodiments of the present invention, based on the increasing text in the instant messaging communication and decisions made by the instant messaging user of the instant messaging session analytic services working on the text are dynamically adapted as needed, not running any unnecessary analytic services increasing performance.

In another embodiment of the present invention, an instant messaging environment comprising storage means for a global repository of public annotators and look-up services, an instant messaging client system for each instant messaging user of a instant messaging session, an instant messaging server, and a communication infrastructure connecting the instant messaging server and the instant messaging clients is disclosed, wherein each instant messaging client system comprises a shared analytics plug being able to select annotators and/or look-up services of the global repository of public annotators and look-up services for a private annotator stack; wherein the instant messaging client system provides a corresponding instant messaging user with a capability to obtain contextual information by activating annotations provided by the annotators and/or look-up services of the private annotator stack; wherein the instant messaging server is establishing an instant messaging session between a set of instant messaging client systems of corresponding instant messaging users, and supporting a sharing of the contextual information among the set of instant messaging client systems of corresponding instant messaging users as part of the instant messaging session.

In further embodiments of the present invention, the communication infrastructure is usable by registered instant messaging users only, wherein the instant messaging server performs an authentication and/or security check based on profile information of the instant messaging users before supporting the sharing of contextual information among the set of instant messaging users as part of the instant messaging session.

In further embodiments of the present invention, the instant messaging server comprises a configuration database for each registered instant messaging user and generates an instant messaging session configuration based on the configuration databases of the instant messaging users of the instant messaging session and on the instant messaging session, wherein each configuration database comprises the private annotator stack of a corresponding instant messaging user, wherein the instant messaging server determines a stack of common annotators and/or look-up services that correspond to all private annotator stacks of the instant messaging users during startup of the instant messaging session, and/or determines potential useful private and/or common annotators and/or look-up services for the instant messaging session by using a static determination process, and/or a dynamic determination process during the instant messaging session.

In another embodiment of the present invention, a data processing program for execution in a data processing system comprises software code portions for performing a method for handling instant messaging sessions when the program is run on the data processing system.

In another embodiment of the present invention, a computer program product stored on a computer-usable medium, comprises computer-readable program means for causing a computer to perform a method for handling instant messaging sessions when the program is run on the computer.

In another embodiment of the present invention, a data processing system for instant messaging, comprises storage means for a global repository of public annotators and look-up services; means for enabling instant message client systems to select annotators and/or look-up services of the global repository of public annotators and look-up services for private annotator stacks; means for providing contextual information to instant messaging client systems in response to the instant messaging client systems activating the public annotators and/or look-up services; and means for supporting sharing of the contextual information among a set of instant messaging client systems of corresponding instant messaging users as part of an instant messaging session.

In further embodiments of the present invention, an instant messaging server is used for establishing instant messaging sessions between instant messaging client systems of corresponding instant messaging users.

In another embodiment of the present invention, an instant messaging client system, comprises a shared analytics plug being able to select annotators and/or look-up services of a global repository of public annotators and look-up services for a private annotator stack; and means for activating annotations provided by the annotators and/or look-up services of the private annotator stack for obtaining contextual information.

In yet another embodiment of the present invention, an instant messaging system, comprises a set of instant messaging client systems; an instant messaging server for establishing an instant messaging session between instant messaging client systems of corresponding instant messaging users; a data processing system interoperable connected to the instant messaging server; and a communication infrastructure connecting the instant messaging server and the instant messaging clients.

All in all, embodiments of the present invention address the instant messaging communication between two or more users and allow enriching, modifying, and restructuring the content each user may see in a corresponding instant messaging window shown on a display of the instant messaging client. Embodiments of the present invention allow also sharing the results of annotators and/or look-up services among some or all users involved in the current communication thread.

The core idea of the present invention is to implement a real time instant messaging communication, during which one user can share in real time local/private context enrichments relevant to the other users. This improves the value of the conversation, and increases efficiency of the communication. Opposite to similar prior art technologies, the present invention leverages a server side component for proper color coding and does not work on the client side alone. To be able to color code content based on visibility; the text is processed on the instant messaging server, which has information about all instant messaging participants. For example, when user A types in some text, the client machine for user B cannot properly color code the annotated text since it does not have detailed information about user A's access privileges. Only the instant messaging server has that level of detail about all participants. Instead or additional to different colors other visually distinguishable different features like fonts, icons etc. can be used to indicate that a visualization is used to differentiate various areas form one another. This server side-approach sets the present invention ahead of the game from other prior art technologies which are limited to client-side processing only. Combining the access rights and settings of multiple users to produce a composite version of the annotated text that factors in all of the users permissions is one such aspect others technologies can not deliver.

Based on the increasing text in a instant messaging conversation and the decisions made by the users, embodiments of the present invention dynamically adapt the analytic services working on the text as needed not running any unnecessary analytical services increasing performance. This performance optimization is possible due to the real-time nature of the instant messaging conversation in a known environment in which the relationship between the instant messaging users can be determined by checking reporting structures, employee directories for job roles, interests, areas of expertise, etc. Based on this determined relationship a set of relevant analytical and/or lookup services can be automatically selected for the users.

Embodiments of the present invention are able to learn on three levels. In a first level embodiments of the present invention learn in the context of one instant messaging session. The more messages are exchanged between the two instant messaging users, the more specific contextual information can be computed and made available. To compute the specific contextual information service metadata and ontology are used based on keywords to classify a discussion as belonging to a topic to which certain services correspond. In a second level embodiments of the present invention learning annotators are implemented. For example, if during one instant messaging environment session there was an ambiguity about a "John", e.g. multiple choices where found, on the next instant messaging session the name "John" would be resolved automatically to the previously selected one if the same users are in the instant messaging session again. Thus the annotators learn over time from instant messaging interactions between the same users. In a third level embodiments of the present invention learning decisions for certain actions are implemented. If certain users have discussed scheduling a meeting before and from the suggested meeting action the meeting was actually triggered for scheduling, embodiments of the present invention can learn to do this automatically next time.

Additional benefits/advantages of embodiments of the present invention include to display not only contextual information on detected entities but to allow the user to trigger actions from the detected entities that support current work of the user. The actions can be suggested and prioritized by the instant messaging environment or even be triggered automatically depending on context for the user. Examples include finding free-time in other users calendars, finding a meeting room that is near to the invitees offices, scheduling a meeting, granting/revoking privileges on resources like e.g. team rooms, other persons calendar, databases, disambiguating entities like e.g. persons, personal numbers, etc. to avoid misunderstandings, calculating time-zone differences, currency and measurement conversions.

Embodiments of the present invention preferably work in the context of a secured intranet network environment. The reason for this is that the enrichment of the messages exchanged using the enterprise instant messaging communication stream have to consider access privilege management for used back-end systems, confidentiality, secured communication and other security aspects. Therefore, the analytical services as well as the lookup service infrastructure have been deployed preferably within the context of the instant messaging server.

Embodiments of the present invention allow users to share the additional contextual information being displayed on either of the discussion partners sides to ensure that both parties have the same basis of discussion—this is real-time context sharing. The share operation from a private annotator considers security/confidentiality of the information to be shared. This is working because the enterprise instant messaging communication is based on an identity management where each participant is exactly known. This is difficult to implement in chat infrastructures where it is for a chat participant not absolutely clear implicitly or explicitly who the other persons participating are.

Embodiments of the present invention also involve discussion partners in actions triggered from the content of a discussion thread, wherein multiple levels of interactions are possible.

The above, as well as additional purposes, features, and advantages of the present invention will become apparent in the following detailed written description.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
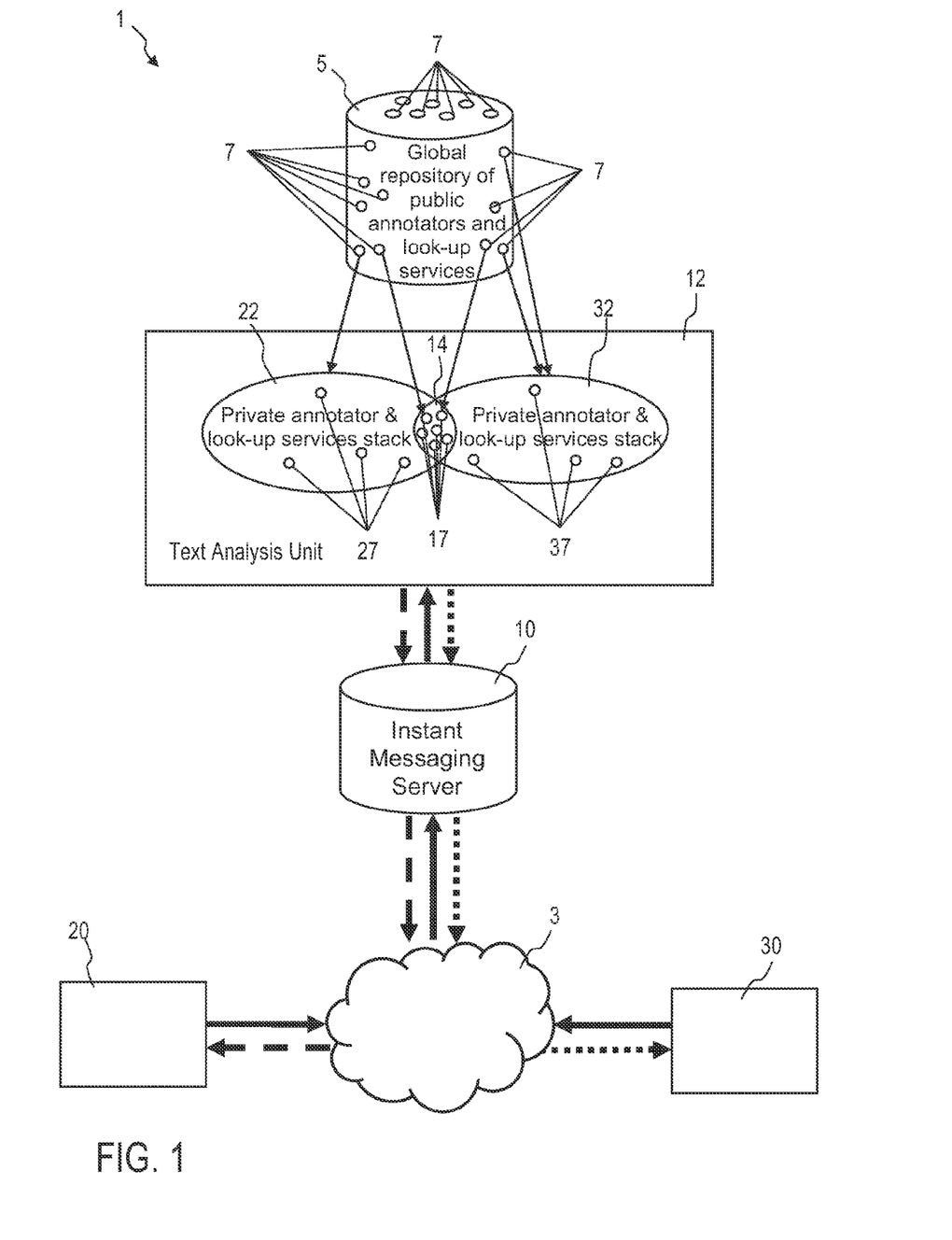
FIG. 1 is a schematic block diagram of an instant messaging environment, in accordance with an embodiment of the present invention.
Figure 2:
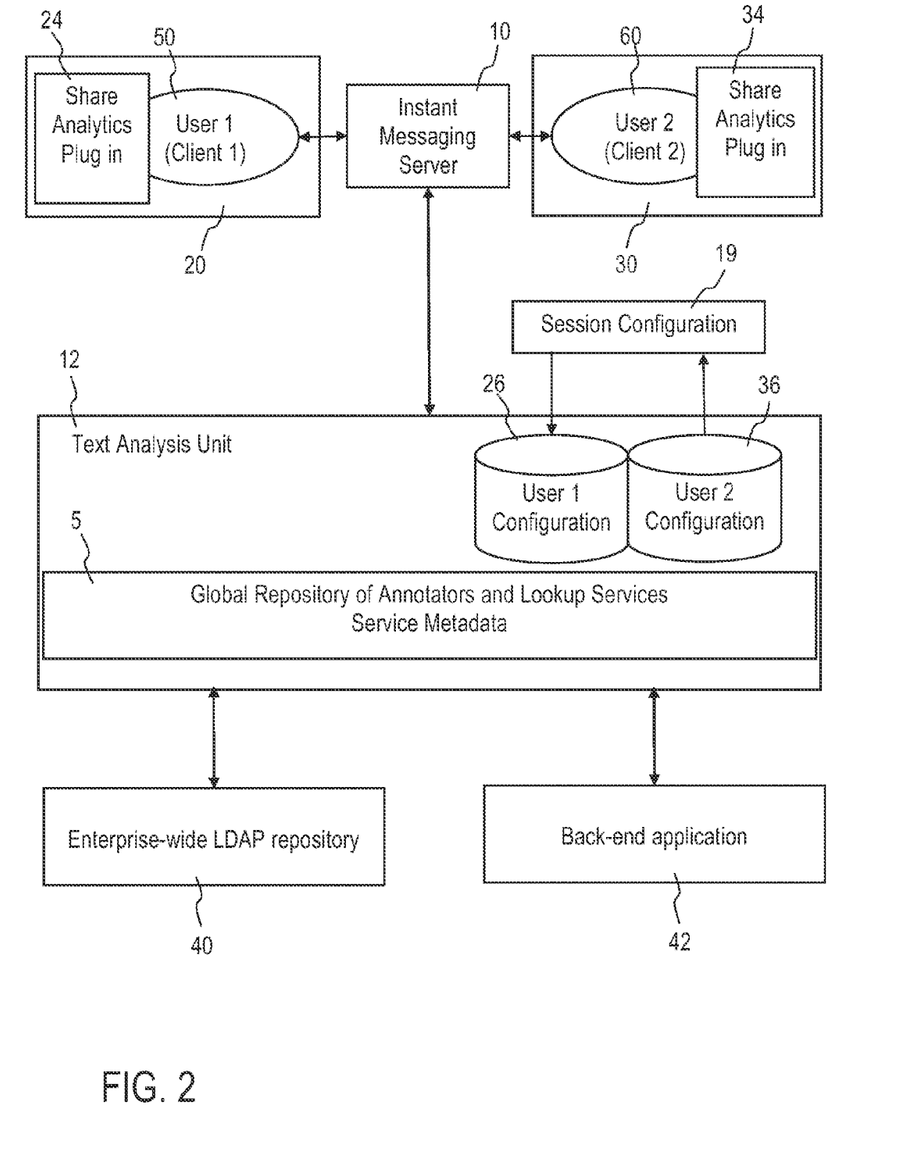
FIG. 2 is a schematic block diagram of architecture of an instant messaging environment, in accordance with an embodiment of the present invention.

FIG. 1 is a schematic block diagram of an instant messaging environment, in accordance with an embodiment of the present invention, and FIG. 2 is a schematic block diagram of architecture of an instant messaging environment, in accordance with an embodiment of the present invention.

Referring to FIGS. 1 and 2, the shown embodiment of the present invention employs an instant messaging environment 1 comprising storage means 5 for a global repository of public annotators and/or look-up services 7, an instant messaging client system 20, 30 for each instant messaging user 50, 60 of an instant messaging session, an instant messaging server 10, and a communication infrastructure 3 connecting said instant messaging server 10 and said instant messaging clients 20, 30. Each instant messaging client system 20, 30 comprises a shared analytics plug-in 24, 34 being able to select annotators and/or look-up services 7 of the global repository 5 of public annotators and/or look-up services 7 for a private annotator stack 22, 32. The instant messaging client system 20, 30 provides a corresponding instant messaging user 50, 60 with a capability to obtain contextual information by activating annotations provided by said annotators and/or look-up services 27, 37 of the private annotator stack 22, 32, wherein the instant messaging server 10 is establishing an instant messaging session between a set of instant messaging client systems 20, 30 of corresponding instant messaging users 50, 60, and supporting a sharing of the contextual information among said set of instant messaging client systems 20, 30 of corresponding instant messaging users 50, 60 as part of the instant messaging session.

According to the architecture of the shown embodiment of the instant messaging environment 1 the instant messaging server 10 is an intranet enterprise messaging communication infrastructure and instant messaging clients 20, 30 are used by the users 50, 60 as base infrastructure. The back-end instant messaging server 10 is modified to work with a text analysis unit 12. The text analysis unit 12 includes the global repository 5 of annotators and/or look-up services 7 with annotator and/or look-up service metadata, analytics configuration 26, 36 per instant messaging user 50, 60, access rights management to allow sharing of formerly private components, algorithm to determine shared configuration components, real-time sharing algorithm, dynamic session configuration algorithm based on determinable relationship between instant messaging users 50, 60. On the instant messaging client 20, 30 a client side component is deployed which is called share analytics plug-in 24, 34. The share analytics plug-in 24, 34 is browsing the global repository 5 of annotators and/or look-up services 7 and selecting from all offered services the services the user 50, 60 is interested in. With this configuration step the default analytics configuration of the user is enriched. The users 50, 60 select color codes/text properties for the selected services. At least a visual distinction is needed between what both users 50, 60 can see and what only one user 50, 60 can see exclusively. This visual distinction is needed to make the user 50, 60 aware of the enrichment results. The share analytics plug-in 24, 34 also allow sharing of private services and/or analytics enrichment results and/or the generation of new annotators and/or look-up services.

The global repository 5 of annotators and/or look-up services 7 is a part of the text analytics extension back-end system 12 in the intranet system infrastructure. As a new component it contains a service metadata catalog component containing metadata about the available annotator and/or lookup services. The metadata of the services represent a semantic classification of the services representing service ontology. This means, if this metadata is queried that it can be determined whether or not the function provided by the service would be useful for the given context. This metadata is used in the dynamic configuration update based on instant messaging relationship algorithm.

The second new component is the user configuration component 26, 36 with a server side unit. The user configuration component 26, 36 manages for each registered instant messaging user 50, 60 a specific user configuration 26, 36. This user configuration 26, 36 on the instant messaging server 10 has user specific configuration and a link to a shared session configuration 19. The shared session configuration 19 is represented by a complete description of a list of shared services and by a list of users 50, 60 for each service sharing it. A shared service is given by two criteria. First it has a fixed set of mandatory attributes with no choice for end user 50, 60 to select which attributes are used and therefore the invocation pattern is fixed with no optional attributes. Second it has a measurable amount of all users 50, 60 who need it, i.e. all users in a role or all users in an enterprise. This reduces overall storage need for the configuration because the relevant service information is stored only once with a list of users 50, 60 using it. The server side unit for the shared session configuration 19 is used to define the default configurations per user role and which services are configured as shared services. It also provides all access information to other administration tasks.

If a new user registers on the instant messaging server 10, for this new user a user configuration 26, 36 is created based on default configuration(s). The default configuration contains basic metadata such as user name, user role(s), wherein this information is drawn from the employee directory, for example, but this could be any kind of intranet employee application and represents the job roles/profession the user is assigned to. Based on the user role(s) a set of default annotators and lookup services are copied from default configurations per user role. These default annotators and lookup services are shared services where in the scope of the specific new user configuration 26, 36 created only links to these shared services are created and the user name is added to the shared service user list. Examples include base profile enterprise for all employees independent from user roles with annotator to detect employee names, look-up service to retrieve employee information from the employee directory, etc., an annotator to detect currencies, a look-up service to convert currencies based on current location detected from time zone settings, etc., an annotator to detect time expressions, a look-up service to convert time to local time based on current location, an annotator to detect meeting expressions, a look-up service to book a meeting room, a conference call number and a web conference link, etc. Defined profiles for different fields of activity in the enterprise like developer profiles, patent attorney profiles, and profiles for sales people, managers, etc. comprising multiple of annotators and/or look-up services.

Embodiments of the present invention work to the full degree in a scope of an intranet application environment, because for all instant messaging users a trusted identity has to be established. In embodiments of the present invention it is important to ensure the identity of the instant messaging users 50, 60. The reason for this is that the instant messaging client users 50, 60 have to be entitled to the information if the system enriches instant messaging conversation with information from various back-end systems 42. Therefore, the instant messaging ID when registered is linked against a company wide employee directory and a company wide ID. Based on the ID the instant messaging user 50, 60 gets access to a variety of back-end application systems 42 and the ID is often used to assign authorization privileges either on system or document level within that system. FIG. 2 shows this situation in a general case. Before the text analysis unit 12 is invoking a look-up service 7 of the global repository 5, it would invoke an authentication check against an enterprise wide LDAP repository 40. Assuming for the instant messaging user ID proper authentication permissions are returned from LDAP repository 40 for a specific back-end application 42, then with the retrieved credentials the text analysis unit 12 would invoke the look-up service with these credentials for the back-end application 42. With this, embodiments of the present invention would never return information for which the user 50, 60 no longer has entitlements because the component would always check with the authentication system having the most up to date information available.

The instant messaging server 10 is running a shared configuration components detection algorithm. This algorithm computes the difference when a instant messaging session starts, an instant messaging user 50, 60 re-configures the user configuration 26, 36 using the shared analytics plug-in 24, 34 of the instant messaging client 20, 30, and instant messaging users 50, 60 recommends an analytical/lookup feature to another users 50, 60 through the instant messaging infrastructure.

In any of these three events, the algorithm determines the list of shared services between the instant messaging users 50. In the case of a pair of users 50, 60 where exactly two persons participate in an instant messaging session the list is the number of shared services between these two persons. In the case of a multi-person instant messaging session with the number of participants greater or equal to three, the list of the shared services is exactly the list of services all instant messaging users 50, 60 participating have in common, instead of a list where the service is shared by at least two participating users. This distinction is used because each instant messaging user 50, 60 should only see what the respective instant messaging user 50, 60 is entitled to see and the colored distinction what is common and what is private uses this information as input. Furthermore, in the case of a multi-person instant messaging window, this common window should only allow to see either information which is related to private services or information shared by all instant messaging users 50, 60 based on their configuration. Also the algorithm determines the list of private services given automatically as complement to the previous operation, for example.

The algorithm itself is fairly simple. In the case of two persons participating in an instant messaging session, for each service in the configuration 26 of user 1 the algorithm searches in the configuration 36 of user 2 if the service exists there as well. If yes, the service is added to the shared service list for the instant messaging session and marked as shared for both instant messaging users 50, 60 for this instant messaging session. A service from user 1 not found in the service list of user 2 is marked as private service for the instant messaging session. Once all services are considered for user 1, the service list of user 2 is considered for any service not marked as shared. Any service found is marked as private service for user 2 for this instant messaging session. The list of shared services is potentially extended by the list of shared services the system computes based on available information about the two users 50, 60. Finally, for each item of the shared service list it is checked against the instant messaging server 10 how many instant messaging users 50, 60 are on the system. With that, for the service the overall number of current subscribers, i.e. instant messaging users who have the service in their configuration, is determined if the service is not yet part of the globally shared infrastructure 5. If a certain threshold, e.g. 30%, of the registered users is exceeded, this shared service of the two users 50, 60 becomes a globally shared service in the globally shared infrastructure 5.

For three or more instant messaging participants in a multiple user session, the algorithm works similarly except that a shared service must be found in all user configurations; otherwise it's a private service.

Figure 7:
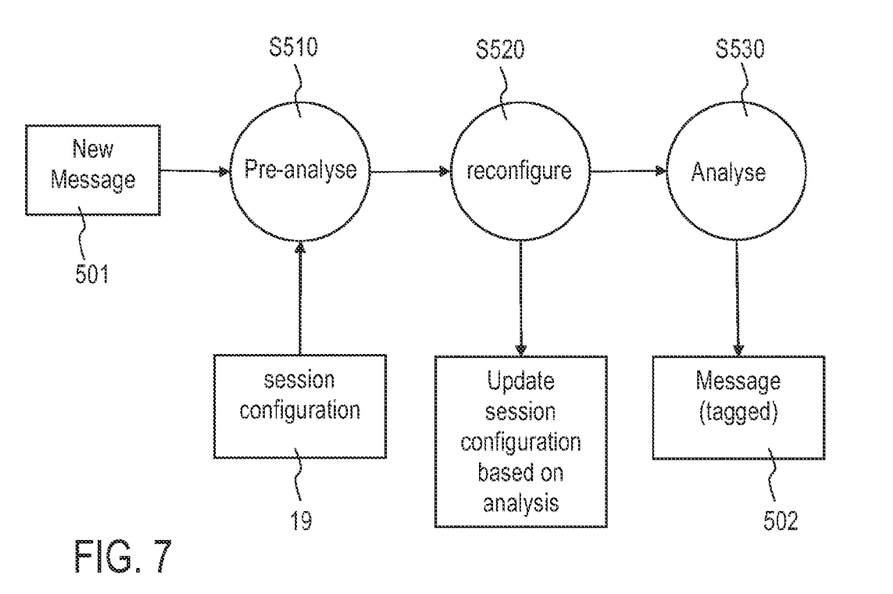
FIG. 7 is a schematic flow chart of processing a message as part of the method for handling instant messaging sessions, in accordance with an embodiment of the present invention.

The instant messaging server 10 is also running a real-time sharing algorithm of private services and results. Assuming the instant messaging session configuration is instantiated the instant messaging session between users 50, 60 starts. At the beginning of the instant messaging session there is not a whole lot of information to analyze available, e.g. from a "Hello" there is not much to derive. As the instant messaging session progresses, there is over time more information available with each instant messaging message exchanged. Therefore, opposite to a one time analysis of a requested webpage the analysis is repeatedly done in a real-time fashion on a growing text base which is each time analyzed end-to-end, for example. Furthermore, based on user decisions the configuration might change as well requiring re-adjustments in the text analysis unit 12 for the instant messaging users 50, 60. Basically, each time the instant messaging server 10 receives a message from an instant messaging client 20, 30 before delivering the message to the other instant messaging client 20, 30, the following steps shown in FIG. 7 are done. In a step S510 a new message 501 is pre-analyzed. During the pre-analyzing the session configuration 19 for this message 501 is determined. In step S520 the session configuration 19 is reconfigured. During the reconfiguration session configuration 19 is updated. This could be due to a learning event of the system or a configuration change done by at least one user since the last message was exchanged or the fact that a user 50, 60 shared previously private information with the other user 50, 60. During step S530 the real analysis takes place, where for example based on user actions either annotators or the logic suggesting user action can learn triggering a potential re-configuration of the session configuration 19 for the next message. Only when step S530 is complete, a tagged message 502 is sent to the other instant messaging user(s). A tag of a new message could be related to look-up services providing a link to a database with latest information on an annotator in the new message, or to look-up services triggering search engines with key words found by text/data mining in the new message, or to look-up services linking employees on IDT board.

Once a user 50, 60 receives a "tagged" message 502 assuming enrichment took place due to the visually encoding the user 50, 60 can see which portions of the enrichment are visible only to the user and which portions of the enrichment can be seen by all instant messaging participants. For each piece of private enrichment information, the user has now the option to share the piece of private enrichment data in whole or parts, to suggest the other user for a private enrichment data piece the use of services behind it, and to trigger one or multiple actions from an action list if the enrichment data suggests certain actions to be taken. All options are available through the share analytics plug-ins 24, 34 deployed on the instant messaging clients 20, 30. For the first option the instant messaging user 50, 60 has the opportunities to share the private enrichment data in whole or in parts with the other user(s) selecting the part to share. This triggers a special message to the other user. The user 50 uses the share analytics plug-in 24 of the local instant messaging client 20 to mark a piece of enrichment data to be shared with another instant messaging user 60, if there are more then two instant messaging users, a multiple instant messaging user selection would be available, and clicks a share button, for example. The enrichment data to be shared is then packaged into a special chat message containing information about the user sharing the information, the user supposedly receiving the information and look-up service which retrieve the information. The instant messaging message is received by the instant messaging server 10 which forwards the message to the text analysis unit 12 for further processing. The text analysis unit 12 checks for each instant messaging user 60 supposedly receiving the information that the user 60 has the proper authentication and authorization privileges with the enterprise wide LDAP repository 40. The text analysis unit 12 responds to the instant messaging server 10 for which users 60 an update message has to be sent containing the enrichment information. The instant messaging server 10 sends to all instant messaging users 60 having necessary security rights a message which updates the instant messaging session displayed in a window with the appropriate enrichment information.

For the second option user 50 opens the share analytics plug-in 24 in the local instant messaging client 20 and selects the services related to currently private information to be shared and selects the instant messaging user 60 who should share the service information. Once this is done, the user 50 may click on a "Share services" button, for example. A special message is sent to the instant messaging server 10 which identifies the message to be a message requiring action by the text analysis unit 12. The text analysis unit 12 receives this special message and starts processing it. Each user 60 supposed to share the service is checked with the enterprise-wide LDAP repository 40 whether or not the user 50 has required security rights. If yes, the service is added to the user configuration 36 which is part of the global repository 5 with a flag "temporary" on a per service basis, for example. The text analysis unit 12 then sends a message to the instant messaging server 10 to retrieve the complete instant messaging history of the current instant messaging session for re-processing for applicable users to whom the at least one service was added. The instant messaging server 10 sends the current complete instant messaging history of the session for re-processing all applicable users to the text analysis unit 12. The new processed message is sent to the instant messaging server 10 which computes a delta to the information already available on the instant messaging client 30 and derives a matching update message to be sent to the instant messaging client 30. All instant messaging clients 30 which got at least one additional approved service experience a "refresh" of their instant messaging window due to the changed configuration according to additional information. All instant messaging users 60 also receive a pop-up window containing a list of all services added whether or not they like the new service for which a result as sample is potentially already visible showing the user the usefulness of the added service. For each service the user can then select whether or not the service should become a permanent member of the configuration. If this is done for the entire list, the user 60 selects a submit button, for example. A special message is routed through the instant messaging server 10 to the text analysis unit 12. Based on the choice whether or not the user 60 wants the service to become a permanent member of the user configuration 36, the user configuration 36 in the global repository 5 is updated. In case the user 60 agreed to a new service, the "temporary" flag is removed from the service in the user configuration 36. Otherwise the service is deleted from the user configuration 36.

For the third option, the enrichment process with the text analysis unit 12 returns as enrichment a set of suggested actions. If a user 50 selects one or multiple actions, such as picking an employee name to remove ambiguity from "John", for example, booking a meeting room, scheduling a call, distributing a PMR information etc. different things happen. Some examples are discussed to provide the basic ideas. First it is considered an action to remove an ambiguity from an entity, it is assumed for the sake of this example that the security permissions for all instant messaging users 50, 60 are involved, otherwise the sharing would fail. User 50 selects one option from a list of possible options and shares this with the other user 60. As a result, the user configurations 26, 36 for these two users 50, 60 would be updated, that whenever the annotator of the previously ambiguous term is found again during a following instant messaging session the ambiguity is resolved in that a prioritized list is displayed in such a way that the previously selected choice for removing ambiguity is shown first. Alternative options are displayed as second, third, etc. choice. As a result, the system is learning. For this to happen, no specific backend system is needed. The next action is the scheduling of a meeting, it is again assumed for the sake of this example that the security permissions for all instant messaging user 50, 60 are involved. User 50 selects from a suggested action list an action to schedule a meeting. As a result, the user configuration 26, 36 for the involved users are updated, that whenever the same conditions for proposing a meeting to be booked are detected again, this happens automatically next time. As a result, backend systems 42 are invoked to perform the booking operation. This might include several systems such as a room booking system, a web conference booking system to be able to screen share with remote participants if such are detected based on the work location of the users 50, 60 in the employee directory and the calendar system for the users 50, 60 is updated with an entry for all participants. Opposite to the previous example backend systems 42 are involved this time. Furthermore this is another example where the system learns.

Embodiments of the present invention advantageously make it easy to share services or enrichment information, wherein the sharing happens in real-time. Additional the receiving user 60 is able to recognize potentially results of new services in the context of a real instant messaging session currently taking place which makes the decision whether or not to use the certain services a more informed decision.

The instant messaging server 10 is also running a dynamic session configuration algorithm based on instant messaging user 50, 60 relationships. The dynamic session configuration algorithm is useful since a user 50, 60 might have changed the configuration between the last and the current message using the share analytics plug-in 24, 34 of the instant messaging client 20, 30, or the system might have changed the configuration applicable to the session based on the analysis of the previous message. The dynamic session configuration algorithm always starts when a new message 501 arrives. The algorithm always ends with output how the session configuration for the analysis needs to be changed if applicable. The algorithm starts with loading the current user configuration for all involved instant messaging users 50, 60. This includes changes in the way annotators work due to a learning step as outlined before. A job profile match, a department match, reporting chain match, an email exchange, an instant messaging session, or a buddy list match are computed only when the instant messaging session initially starts. The key essence for this step is the exploitation of the knowledge available about the users 50, 60 due to having a trusted identity as mentioned before. With the information accessed and included in an overall judgment step the system can suggest the use of certain additional services based on the relationship of the users 50, 60. The suggestion considers access rights, this means the result of an augmentation step to the user configuration might lead to an enrichment for all instant messaging users 50, 60 if all instant messaging user 50, 60 have the necessary rights, to an enrichment for all instant messaging users 50, 60 for a subset of the services and to an enrichment for private services on a user basis if indicated by security permissions, to an enrichment for all instant messaging user 50, 60 with private services only, and to no enrichment at all if no feasible suggestion can be computed. If a message has to be analyzed, text mining is used to determine the topic of the discussion, based on the complete chat history for the current instant messaging session. Based on the text mining results, a comparison against a discussion area dictionary is done. If matching entries in this ontology classification provided by the discussion area dictionary are found, a search is done with these keywords against the metadata for the services in the global repository 5 for annotators and/or look-up services 7. If services contain in their metadata matching entries, the services are suggested to be deployed to the user configuration 26, 36. The suggestion results can be the same four outcomes mentioned in the previous step. This step represents the learning behavior of the system if more information becomes available due to the growing context with each message exchanged.

As part of the share analytics plug-in 24, 34 it is possible for the instant messaging client 20, 30 to upload locally developed services, analytical services as well as look-up services to the centralized global repository 5 for others to use. This fosters an intranet community to develop new services for the infrastructure.

Figure 3:
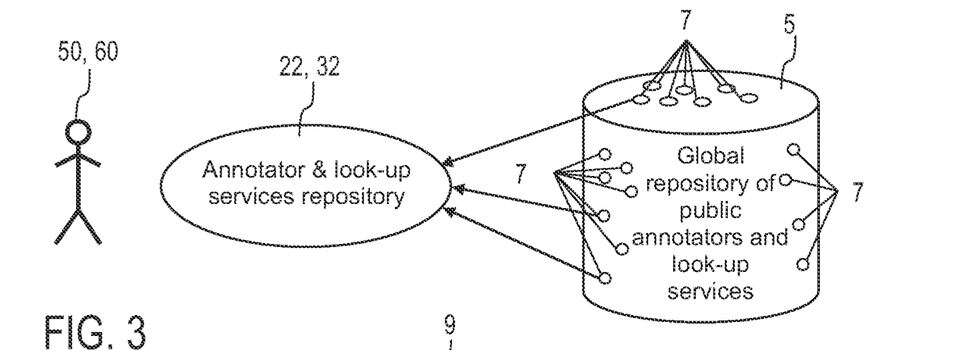
FIGS. 3 to 5 are diagrams showing a high-level overview how a method for handling instant messaging sessions works, in accordance with an embodiment of the present invention.
Figure 4:
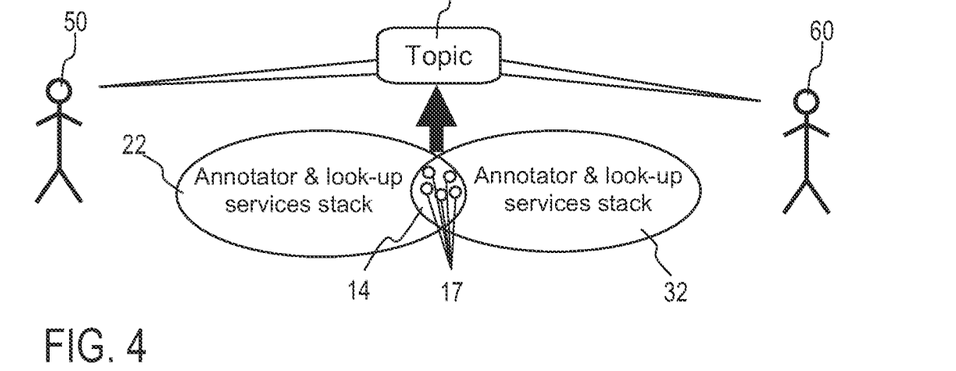
Figure 5:
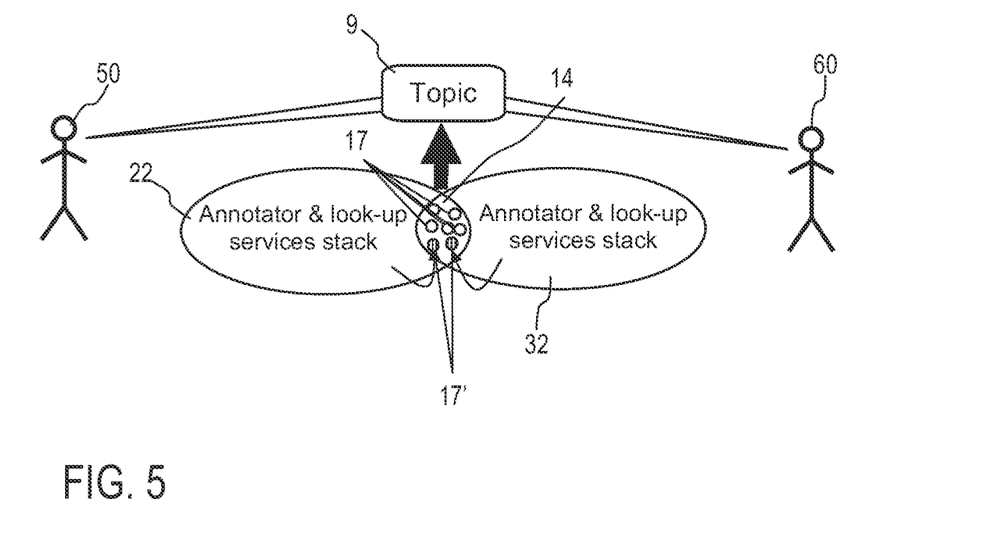

FIGS. 3 to 5 are diagrams showing a high-level overview how a method for handling instant messaging sessions works, in accordance with an embodiment of the present invention.

Referring to FIGS. 3 to 5 the instant messaging user 50, 60 configures his annotator and look-up service stack 22, 32 in accordance to related business needs. The user 50, 60 customizes the related instant messaging client 20, 30 according to the related business needs by selecting global annotators and associated look-up services 7 from the company wide repository 5. Annotators are text analysis parts, they later will process the text messages exchanged by the two discussion partners 50, 60 and detect entities, like e.g. persons, places, dates, times, PMR numbers, phone numbers, disclosure numbers, currency amounts, etc. Look-up services are used to enrich an entity detected by an annotator with additional information and/or allow the users 50, 60 to start actions on selected entities, e.g. schedule a meeting when at least two persons and one time entity were detected in the message text, translate a selected word, or display the local time when a time was posted by a discussion partner in a different time zone, select a persons full name from a list of candidates when only a first name was mentioned. The relation between annotator and look-up service is 1 to many, e.g. there could be one annotator that detects phone numbers but different look-up services allow e.g. to dial this number using a corresponding backend application 42, to add this number to the local address book, etc. This configuration is very special to the user's current job role, while a patent attorney will most likely use annotators that detect disclosure numbers and allowing to easily navigate to the disclosure database when a disclosure number was detected during the conversion, a software developer may be interested in disclosures too as he submitted some but the daily job more often deals with line item numbers, defect numbers etc. The annotator and/or look-up services repository 5 can be updated and modified by the user at any time for instance in case the job role changes, e.g. the software developer moves to sales, etc.

Two users 50, 60 with a most likely different annotator and/or look-up service configurations 22, 32 chat about a topic 9. During a conversation both parties 50, 60 have related private repositories 22, 32 of annotators and/or look-up services and gets related results displayed. Most likely they also have some annotators and/or look-up services in common 17; this is very likely as they have a discussion on a certain topic 9 they both are interested in. The common annotators and/or look-up services 17 may be located in common annotators and/or look-up services stack 14. Referring to an example with a conversation between a patent attorney and a software developer, they may e.g. both use a "disclosure annotator" so in case one of them types a disclosure number, they can click on the disclosure number, navigate to the patent database and have a look at the disclosure text. To make clear which information is available to one user 50 exclusively, only the detected entities are highlighted e.g. in blue color. Entities that the discussion partner 60 is able to see also and which has look-up services are colored in another color, e.g. green, so that both parties 50, 60 can easily see what additional information or actions based on the given entity are available for both of them. This is a good vehicle to ensure that both parties 50, 60 are talking about the same thing, remember the example with the number that could be anything like a phone number, part of a disclosure number, a feature or defect number, etc. Actions that one party 50, 60 triggers will directly affect the other party 50, 60, e.g. in case the first name "Martin" was mentioned and the look-up service found out by using the two persons' buddy list, the organizational structure of the enterprise etc. that two "Martins" come into consideration, one party 50 could select the right person from a list of candidates and this information will be displayed to the other party 60 immediately.

Information from the private repository 22, 32 of a user 50, 60 can be made available to the other party 50, 60. In case that information 17' relevant for the discussion on the current topic 9 is not available for one of the two parties 60, due to not having the corresponding annotator/look-up services in his private repository 32 it can be made available by the other party 50. The software developer 50, who has submitted a disclosure that will be filed, has shipped an algorithm explained in the disclosure in a new feature of a product. The attorney 60 does not use the annotator and look-up services for feature numbers, however the developer 50 does. To keep both discussion partners 50, 60 on the same level of information, the developer 50 is able to easily share the additional information drawn by the look-up services with just one single click and allow the attorney 60 to have a look at the shipment plan, the line item description and the technical specification.

If there is a piece of text with an ambiguity regarding its meaning, the system could use the information about which annotators are shared to resolve it. For example, if one participant has two annotators for resolving PMR and invention disclosure numbers and the other participant has only the annotator for PMRs and a number is detected, then the system prioritizes any contextual results found for PMRs with a higher priority because the likelihood that these two persons chat about the PMR is higher, because of the shared interest. Here the explicit knowledge about shared annotators is exploited.

The following is a simple example of a conversation like it is held a thousand times every day.

A software developer Sebastian 50 is contacting the patent attorney "John" 60 and asks him about the current status of the disclosure he recently submitted. As John 60 and his attorney colleagues often deal with disclosure IDs, they are using an annotator for instant messaging that detects and highlights all disclosure IDs in an instant messaging conversation. By clicking the highlighted disclosure ID, John 60 can easily draw additional contextual information for the given disclosure which is then displayed in the bottom part of his instant messaging window 320, see FIG. 8. The information displayed here can be drawn for any enterprise information system, like e.g. a Notes database, an SAP system, a team room, a database, etc.

Figure 8:
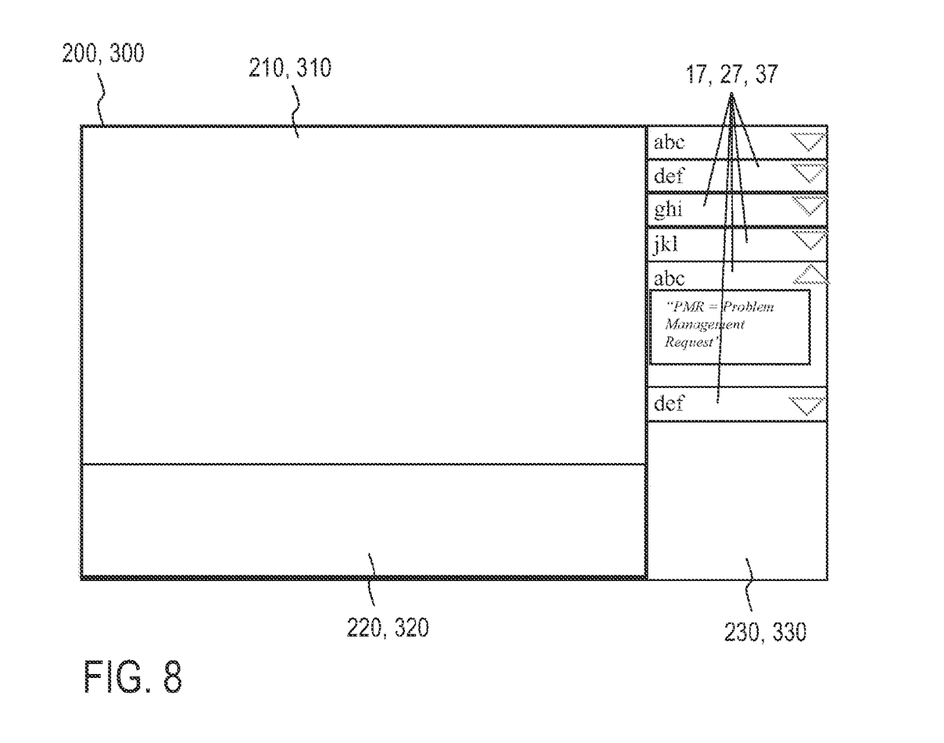
FIG. 8 is a schematic diagram of a display unit of an instant messaging client.

As Sebastian 50 as a developer doesn't work too often with disclosures, he's not using the disclosure annotator. During the conversation with John 60 however, it would be very helpful, if John 60 could share the contextual information with him. The share analytics plug-in 34 offers John 60, to easily share the necessary information with just one click.

Sebastian 50 is now able to see exactly the same information about the disclosure. He can see that "Martha" the evaluator for this patent has some questions. As he is using an annotator that is able to detect all persons listed in the enterprise employee list, he easily is able to contact Martha by simply clicking her highlighted name and choose "Chat with Martha" from a right click context menu, for example. During the conversation with Martha, Sebastian 50 could share the contextual information he got from John 60 with her.

Figure 6:
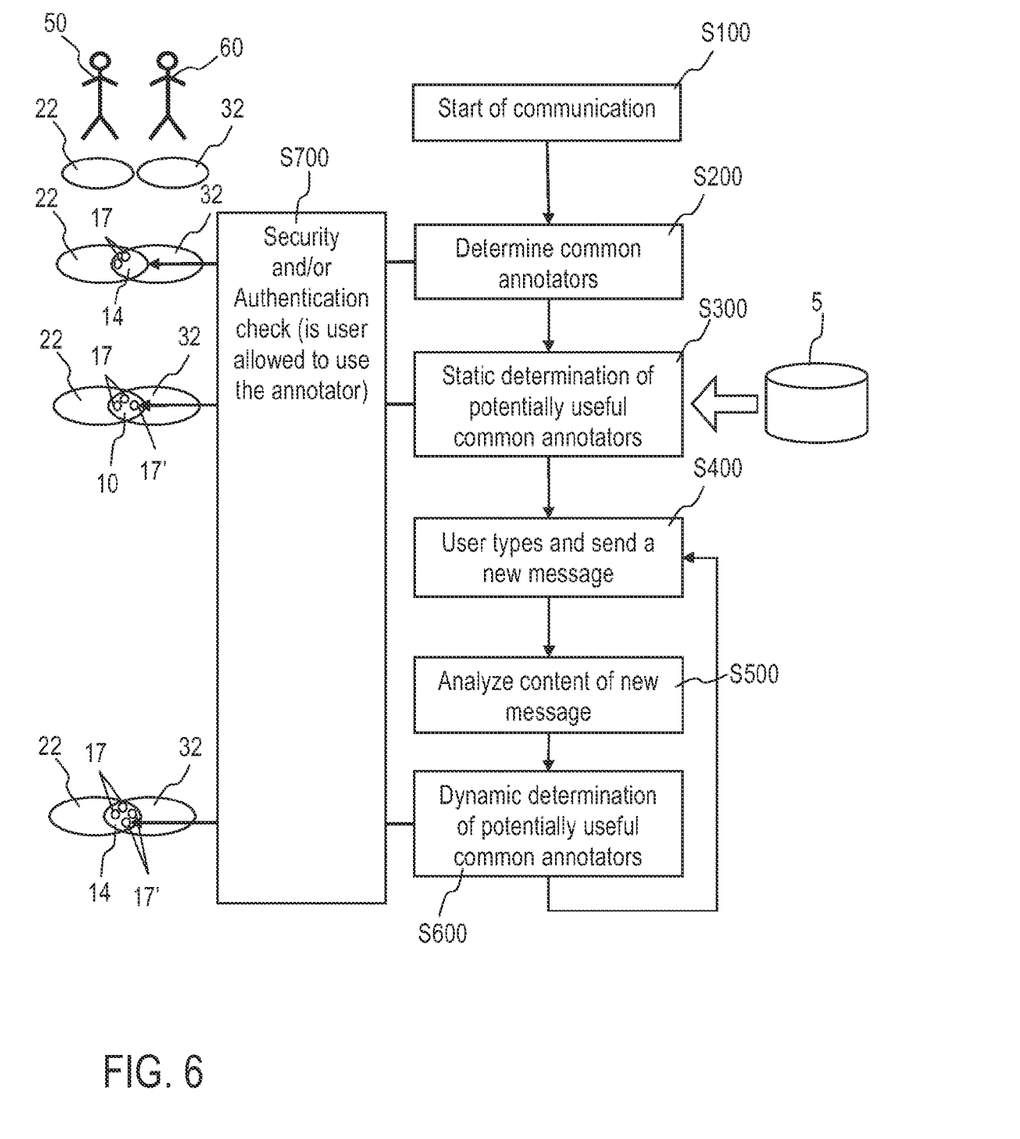
FIG. 6 is a schematic process flow of a method for handling instant messaging sessions, in accordance with an embodiment of the present invention.

FIG. 6 is a schematic process flow of a method for handling instant messaging sessions, in accordance with an embodiment of the present invention.

Referring to FIG. 6 an instant messaging communication starts in step S100. Each partner 50, 60 have a private set 22, 32 of annotators, during startup the intersection 14 of annotators 17 that both parties 50, 60 have in common is determined in step S200. A static determination of potentially useful annotators for the communication between these two persons 50, 60 is done in step S300. During step S400 the chat partners 50, 60 type messages and send them. Each time a new message 501 is sent, the content of the new message 501 is analyzed in step S500, in accordance with the message processing procedure shown in FIG. 7, and a dynamic determination of useful annotators is done in step S600. Potentially useful annotators will be added to the annotator stack automatically. The communication is not interrupted and the user will not be bothered with up-popping message-boxes etc. The new annotators will produce results that are displayed unobtrusive on a display shown in FIG. 8. Whenever a new annotator 17' is added to the set 14 of used annotators 17, a security check is done in step S700 to ensure that the user 50, 60 has the right to see the annotator results being displayed as contextual information.

The static determination of useful annotators of step S300 is done to find out which annotators are useful during a instant messaging communication between two or multiple persons 50, 60. Various data mining algorithms like e.g. "Clustering", "Classification" and "association rule learning" can be used on usage statistics of previous chat conversations. The static determination of useful annotators is analyzing information about the users' primary job role, and information of "annotator" columns containing statistics about how often an annotator delivered helpful results during chat conversation, for example. The data mining algorithm can detect, for example, that whenever two persons chat with each other, results of a certain annotator are very helpful. On the other hand, data mining will also deliver results like "whenever at least one of the persons of the conversation is an attorney, it seems like the results of another certain annotator are very useful." Data mining will also deliver results like "annotator xyz was used quite often in 2008 but seems not to be used anymore, however annotator abc is now used in situations when xyz was previously used", "Whenever annotator def was used, annotator ghi was also used", "No matter what the job role is, annotators abc, def and xyz seem to always be helpful", "Annotator abc is only used from people in country xyz" etc. The user statistics are collected during the chat conversation, e.g. in step S700 of the previous flow chart or when a chat window 210, 310 is closed. The crux of the matter is how to determine which annotator result the user considered to be useful and which not. There are various techniques to track this. Usually the user 50, 60 finds the output of an annotator to be useful if the mouse is hovered over a highlighted term or text passage in a instant messaging session window 210, 310 of the display 200, 300 shown in FIG. 8 being part of the instant messaging client 20, 30. The additional information for the highlighted term is displayed in annotation windows 220, 320 below the instant messaging session window 210, 310, for example, or in annotation windows 230, 330 on the right side of the instant messaging session window 210, 310, for example. In case multiple annotators are triggered for the same term, sections for each annotators results can be displayed e.g. on the right side of the instant messaging session window 210, 310 and the user can expand the section that is of interest. Results of annotators that where proposed by the system will be displayed in a closed section and therefore not bother the user in case the system made a "bad proposition".

During chat conversation dynamic determination of potentially useful annotators in step S600 is done by analyzing the content of the instant messaging messages. Again multiple approaches are possible here. The best results may be generated by combining of regular expressions, which are extremely precise and useful whenever numeric or alphanumeric terms are involved, e.g. amounts of money, dates, product numbers, phone numbers, disclosure and PMR IDs, etc., dictionary based analyzers, which can be used for all kind of entities that can be enumerated, e.g. key words of a programming language, names, languages, countries, employees list entries, etc., and semantic analyzers, which can detect an interpret entities and their meanings in the given context as well as the relationship among them, e.g. two persons, one location and a date are mentioned within the same sentence—this could be a meeting. In principle the technologies used here are very similar to what is used in the annotators themselves.

The inventive method for handling instant messaging sessions in an instant messaging server can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. A method for handling instant messaging sessions in an instant messaging server, comprising:
   through a processor:
   providing in an instant messaging session global annotators for annotating instant messaging communications, wherein instant messaging users in the instant messaging session select for a private enhancement stack at least one of the following: annotators and look-up services;
   obtaining for the instant messaging users contextual information by activating enhancement functions provided by said private enhancement stack;
   determining in the instant messaging session a list of shared services between the instant messaging users in the instant messaging session; and
   supporting sharing said contextual information among said set of instant messaging users as part of the instant messaging session.

2. The method according to claim 1, wherein during startup of said instant messaging session a stack of common annotators and/or look-up services is determined comprising all annotators and/or look-up services, which said corresponding private enhancement stacks of said instant messaging users have in common.

3. The method according to claim 1, wherein potential useful private and/or common annotators and/or look-up services for said instant messaging session of said set of said instant messaging users is determined by using a static determination process.

4. The method according to claim 3, wherein during said static determination process at least one data mining algorithm is used on profile information of said instant messaging users and/or on usage statistics of previous instant messaging sessions between at least two instant messaging users of said set of instant messaging users of said actual instant messaging session.

5. The method according to claim 1, wherein during said instant messaging session each sent message is analyzed, wherein new potential useful common and/or private annotators and/or look-up services for said instant messaging session are determined by using a dynamic determination process.

6. The method according to claim 5, wherein during said dynamic determination process a regular expression filter and/or a dictionary based analyzer and/or a semantic analyzer are used on text of said sent message.

7. The method according to claim 1, wherein look-up services are used to enrich an entity detected by an annotator with additional information and/or to start actions on selected entities.

8. The method according to claim 1, wherein common annotators and/or look-up services and/or private annotators of said corresponding instant messaging users of said actual instant messaging session are displayed in different colors and/or other visually distinguishable different features.

9. The method according to claim 1, wherein an authentication and/or security check based on said profile information of said instant messaging users is performed before said contextual information among said set of instant messaging users as part of the instant messaging session is shared.

10. The method according to claim 1, wherein based on the increasing text in said instant messaging communication and decisions made by said instant messaging user of said instant messaging session analytic services working on said text are dynamically adapted as needed, not running any unnecessary analytic services increasing performances.

11. An instant messaging system comprising:
   a hardware processor coupled to a memory element having:
   storage means for a global repository of public annotators and look-up services, said global repository being in an instant messaging session;
   an instant messaging client system for each instant messaging user of the instant messaging session;
   an instant messaging server supporting the instant messaging session between the instant messaging client systems corresponding to the instant messaging users of the instant messaging session; and
   a communication infrastructure connecting said instant messaging server and said instant messaging clients,
   wherein each instant messaging client system comprises a shared analytics plug being able to select, in the instant message session, annotators and/or look-up services of said global repository of public annotators and look-up services for a private annotator stack;
   wherein said instant messaging client system provides a corresponding instant messaging user in the instant message session with a capability to obtain contextual information by activating annotations provided by said annotators and/or look-up services of said private annotator stack;
   wherein said instant messaging server determines in the instant messaging session a list of shared services between the instant messaging client systems of corresponding instant messaging users of the instant messaging session, and supports a sharing of said contextual information among said instant messaging client systems of corresponding instant messaging users as part of the instant messaging session.

12. The instant messaging system according to claim 11, wherein said communication infrastructure is usable by registered instant messaging users only, wherein said instant messaging server performs an authentication and/or security check based on profile information of said instant messaging users before supporting said sharing of contextual information among said set of instant messaging users as part of said instant messaging session.

13. The instant messaging system according to claim 11, wherein said instant messaging server comprises a configuration database for each registered instant messaging user and generates an instant messaging session configuration based on said configuration databases of said instant messaging users of said instant messaging session and on said instant messaging session, wherein each configuration database comprises said private annotator stack of a corresponding instant messaging user, wherein said instant messaging server determines a stack of common annotators and/or look-up services that correspond to all private annotator stacks of said instant messaging users during startup of said instant messaging session, and/or determines potential useful private and/or common annotators and/or look-up services for said instant messaging session by using a static determination process, and/or a dynamic determination process during said instant messaging session.

14. A data processing system comprising:
 a computer executing a data processing program having software code portions for performing a method of handling instant messaging sessions in an instant messaging server;
 when said computer runs said data processing program, the computer: providing in an instant messaging session global annotators for annotating instant messaging communications, wherein instant messaging users in the instant messaging session select for a private enhancement stack at least one of the following: annotators and look-up services;
 providing instant messaging users with a capability to obtain contextual information by activating enhancement functions provided by said private enhancement stack;
 determining in the instant messaging session a list of shared services between the instant messaging users; and
 supporting sharing said contextual information among said instant messaging users as part of the instant messaging session.

15. A computer program product residing on a non-transitory computer-usable medium having a plurality of instructions stored thereon which, when executed by a processor, cause the processor to perform operations for handling instant messaging sessions in an instant messaging server comprising:
 providing in an instant messaging session global annotators for annotating instant messaging communications, wherein instant messaging users in the instant messaging session select for a private enhancement stack at least one of the following: annotators and look-up services;
 obtaining for the instant messaging users contextual information by activating enhancement functions provided by said private enhancement stack;
 determining in the instant messaging session a list of shared services between the instant messaging users in the instant messaging session; and
 supporting sharing said contextual information among set of instant messaging users as part of the instant messaging session.

16. A data processing system for instant messaging, comprising:
 a memory storage providing a global repository of public annotators and look-up services in an instant messaging session;
 for each instant messaging user in the instant messaging session, a respective instant messaging client system configured to select public annotators and/or look-up services of said global repository, said selecting being for private annotator stacks and being in the instant messaging session;
 wherein each of the instant messaging client systems is configured to obtain contextual information by activating said selected public annotators and/or look-up services of the respective private annotator stack; and
 an instant messaging server determining in the instant messaging session a list of shared services between the instant messaging users, and supporting sharing of said contextual information among the instant messaging client systems of corresponding instant messaging users as part of the instant messaging session.

17. A data processing system of claim 16, further comprising a communication infrastructure connecting the instant messaging client systems; and
 wherein the instant messaging server further establishes instant messaging sessions between instant messaging client systems of corresponding instant messaging users.

18. An instant messaging client computer system, comprising:
 a hardware processor coupled to a memory element having:
 a shared analytics plug executable by the processor and being able to select annotators and/or look-up services of a global repository of public annotators and look-up services for a private annotator stack, said selecting being in an instant messaging session; and
 processor means for activating annotations provided by said annotators and/or look-up services of said private annotator stack for obtaining contextual information such that an instant messaging server (i) determines in the instant messaging session a list of shared services between the instant messaging users, and (ii) supports sharing of said contextual information among the instant messaging users as part of the instant messaging session.

19. An instant messaging system, comprising:
 in an instant messaging session through a hardware processor coupled to a memory element:
 a set of instant messaging client systems configured to activate annotations provided by public annotations and/or look-up services of a global repository but selected for a private annotator stack, and to obtain contextual information from said activated annotations;
 an instant messaging server for establishing the instant messaging session between instant messaging client systems of corresponding instant messaging users;
 a computer processor including a data processing system interoperably connected to said instant messaging server such that the instant messaging server (i) determines in the instant messaging session a list of shared services between the instant messaging users, and (ii) supports in the instant messaging session sharing of said contextual information among the instant messaging client systems of corresponding instant messaging users as part of the instant messaging session; and
 a communication infrastructure connecting said instant messaging server and said instant messaging client systems.

* * * * *